US006323617B1

United States Patent
Maruyama et al.

(10) Patent No.: US 6,323,617 B1
(45) Date of Patent: Nov. 27, 2001

(54) STEPPING MOTOR DRIVE CONTROL CIRCUIT

(75) Inventors: Kenichi Maruyama, Kashiwa; Atsushi Ohtani, Abiko, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/420,839

(22) Filed: Oct. 19, 1999

(30) Foreign Application Priority Data

Oct. 26, 1998 (JP) .................................................. 10-321307

(51) Int. Cl.[7] ....................................................... H02P 8/00
(52) U.S. Cl. ............................................ 318/696; 318/695
(58) Field of Search ..................................... 318/695, 696

(56) References Cited

U.S. PATENT DOCUMENTS

| | | | | |
|---|---|---|---|---|
| 3,986,094 | * | 10/1976 | Quioque et al. | 318/696 |
| 4,609,857 | * | 9/1986 | Ishii | 318/696 |
| 5,061,888 | * | 10/1991 | Hiraoka | 318/696 |
| 5,075,609 | * | 12/1991 | Ito et al. | 318/696 |

* cited by examiner

Primary Examiner—Robert E. Nappi
Assistant Examiner—Rita Leykin
(74) Attorney, Agent, or Firm—Fitzpatrick, Cella, Harper & Scinto

(57) ABSTRACT

A stepping motor preferably applied to an image reading motor for a facsimile device or the like, drives the rotation with low noise by repeating turning-on and turning-off switching of the driving voltage in the stepping motor when a change of the exciting phase in the stepping motor is not continued for a constant time and performing the repeated switching for a predetermined cycle. At the same time the present motor can prevent the passage of current through all of four phase coils by the manner that a pair of phases in the stepping motor are not simultaneously driven.

12 Claims, 3 Drawing Sheets

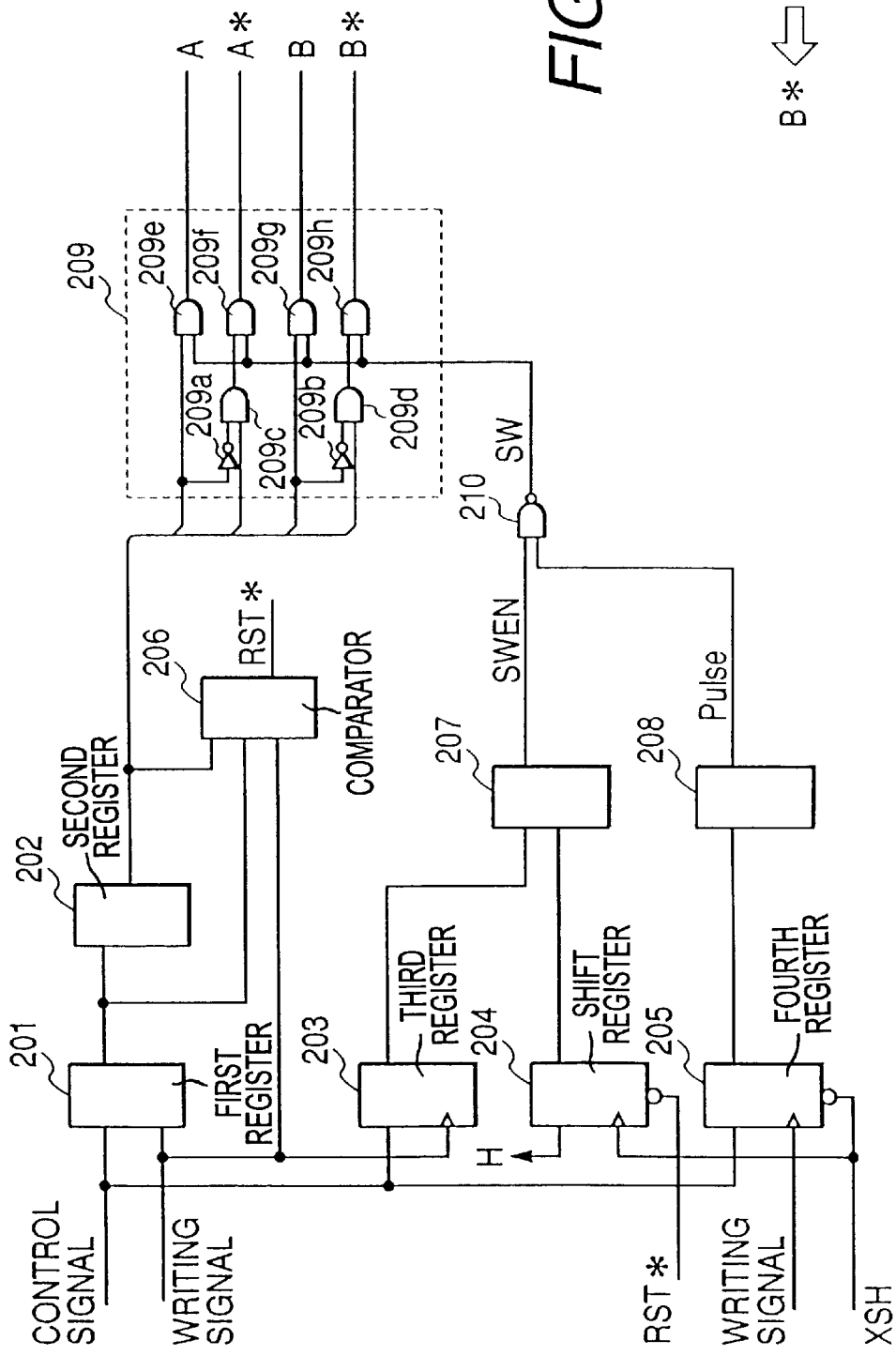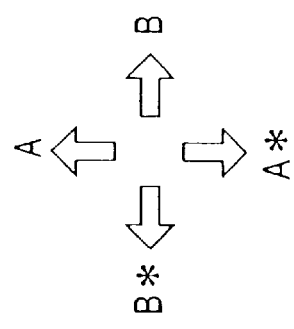

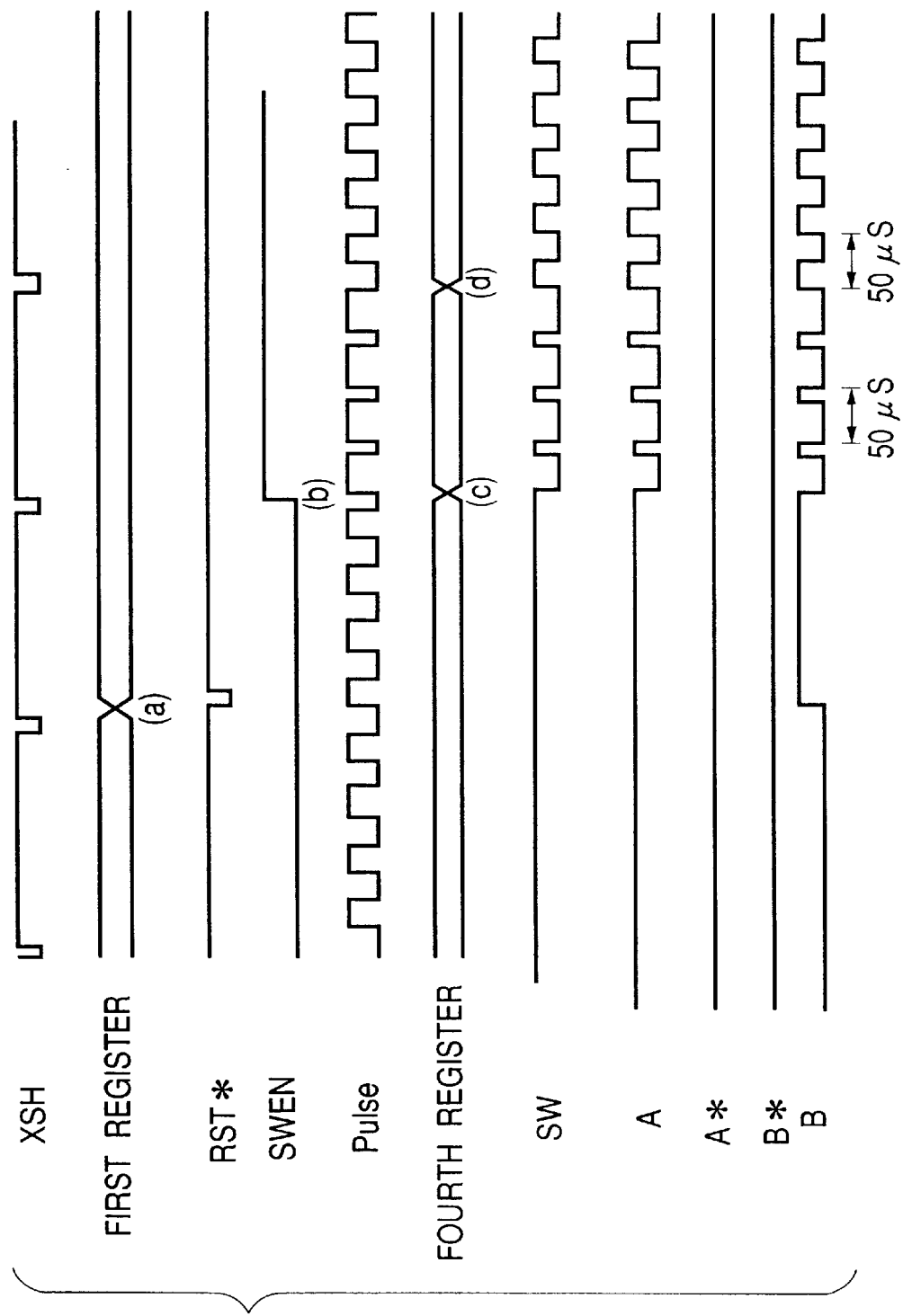

STEPPING MOTOR DRIVE CONTROL CIRCUIT

BACKGROUND OF THE INVENTION

1. Field of the Invention

The present invention relates to a stepping motor, drive-control circuit preferably used as, for example, an image reading motor for a facsimile or the like.

2. Related Background Art

In a facsimile sheet conveying system and the like, a stepping motor has been generally used. As the driving systems for the stepping motor, a constant-current driving system and a constant-voltage driving system are used. For driving at a relatively low speed, a constant-voltage driving operation is often performed using a four-phase unipolar stepping motor in which the driving circuit can be simplified.

However, when a general four-phase unipolar stepping motor is used, current flows through all of the four-phase coils under the worst conditions so that equipment may be damaged by the excess increase of the temperature of the motor. The addition of a protective circuit for breaking current or the like with a thermal fuse is considered to prevent the damage during a software runaway malfunction. However, a cost increase is caused by the addition of the protective circuit, for example, in a protective circuit using the thermal fuse, and an exchange of a part was required for regeneration during a circuit operation.

Further, a problem occurs that when the motor is driven by the same driving force in low speed driving as that in high speed driving, the excessively large driving force results in a greater conveyance noise.

SUMMARY OF THE INVENTION

An object of the present invention was made in consideration of the above-mentioned facts and is to provide a low noise, stepping-motor, drive-control circuit by repeating on- and off-switching of a phase signal in response to the stepping motor speed.

Another object of the present invention is to generate a phase signal so that no pair of phases of a stepping motor are driven at the same time.

Still another object of the present invention will become apparent from the concrete examples described later.

BRIEF DESCRIPTION OF THE DRAWINGS

FIG. 2 is a circuit diagram showing the main portion of an image-reading, stepping-motor, drive-control circuit of the facsimile device shown in FIG. 1;

FIG. 3 is a view explaining the exciting phase of the stepping motor shown in FIG. 1 and the directions of the generated forces; and FIG. 4 is a time chart of the stepping motor drive control circuit shown in FIG. 2.

DESCRIPTION OF THE PREFERRED EMBODIMENTS

Figure 1:
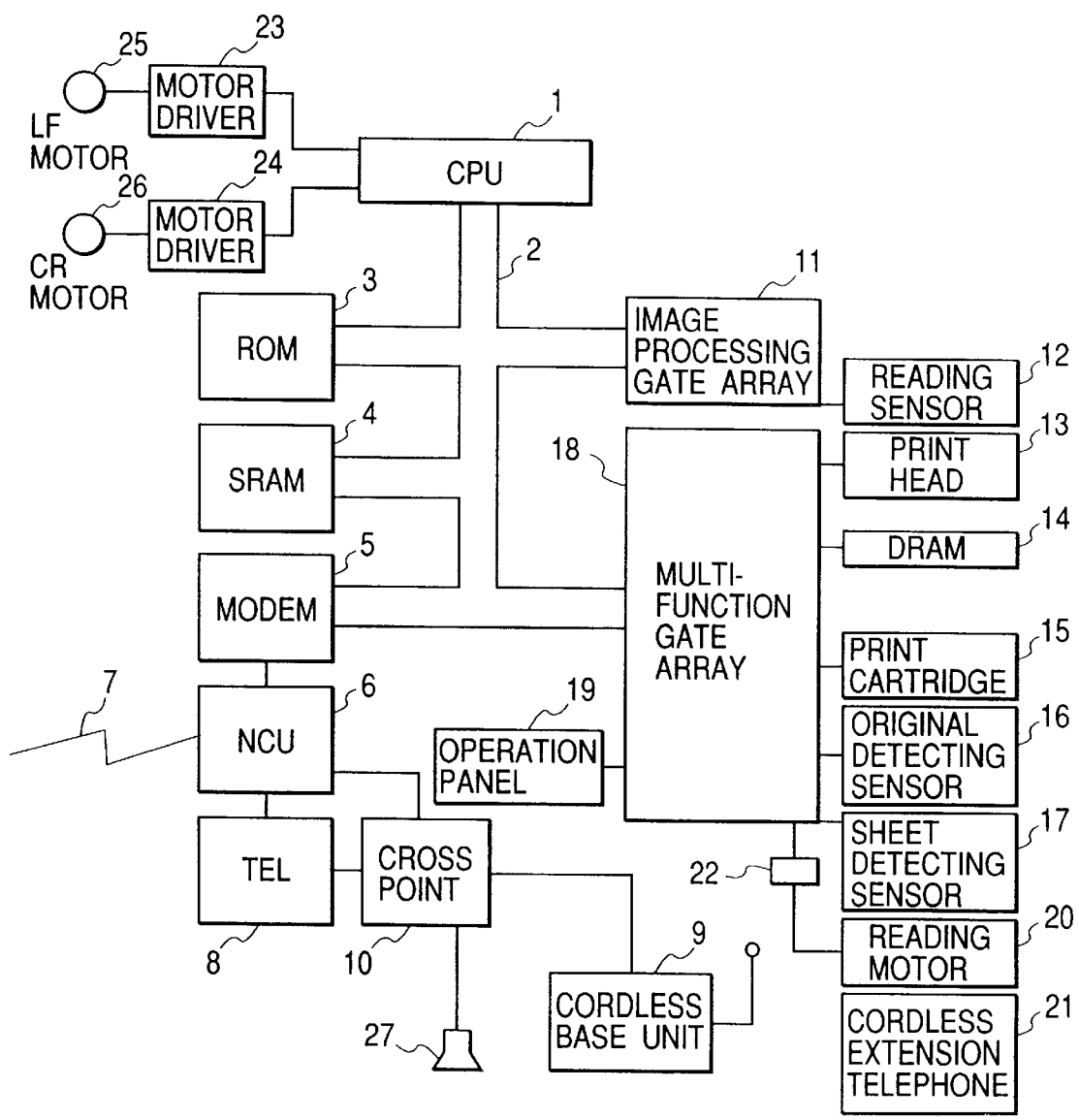
FIG. 1 is a circuit block diagram of a facsimile device shown as one example to which a stepping motor drive control circuit according to the present invention can be applied.

Examples of the present invention will be described below with reference to drawings.

First, as one example to which a stepping-motor drive-control circuit of an example of the present invention can be applied, a facsimile device will be described. FIG. 1 is a circuit block diagram of a facsimile device to which a stepping-motor drive-control circuit of an example according to the present invention can be applied. Since the configuration of the facsimile device shown in FIG. 1 is general, the functions of the respective parts are schematically described.

In FIG. 1, reference numeral 1 denotes a CPU that controls the operations of all facsimile devices of the present invention, reference numeral 2 denotes a bus used for outputting and inputting data, inputting and outputting commands, and the like, also, reference numeral 3 denotes a ROM in which a program for controlling the CPU is stored, reference numeral 4 denotes a SRAM for memorizing the user registered information and the like, reference numeral 5 denotes a modem for modulating image signals and sound signals, reference numeral 6 denotes a network control unit for controlling the connection between a telephone line and the present device, reference numeral 7 denotes a public telephone line, reference numeral 8 denotes a cable telephone set, reference numeral 9 denotes a cordless base unit which communicates with a cordless telephone, reference numeral 10 denotes a cross-point switch that switches denotes a voice data path, reference numeral 12 denotes a reading sensor (line sensor) that reads an image, reference numeral 11 an image processing gate array, and 13 denotes a print head for recording images. 21 denotes a cordless extension telephone that can be in communication with the cordless base unit 9.

Further, reference numeral 14 denotes a DRAM for temporarily storing images to be supplied to the print head, reference numeral also 16 an original detecting sensor for detecting the width of the original and the presence and absence of the original, 17 denotes a sheet detecting sensor for detecting the sheet size and the presence and absence of the sheet, reference numeral 20 denotes a reading motor for carrying the original, reference numeral 22 denotes a motor driver (transistor array) for driving the reading motor, and 19 denotes an operation panel, that includes a keyboard and an LCD that displays the state of an image forming device and the like.

Further, reference numeral 18 denotes a system gate array (multi-function gate array) connected to the print head 13, the DRAM 14, the respective sensors 16 and 17, the motor driver 22 of the reading motor 20, and the operation panel 19.

The system gate array 18 further includes a synchronizing-signal generating portion and a reading-motor, driving-protective circuit, and performs the processing of transferring image data arrayed in the main-scanning direction in accordance with the arrangement of the nozzles of the head to image data arrayed in the subscanning direction, processing of converting key-input data input from the keyboard, various data, and output signals of various sensors, to code signals that the CPU can judge, and timing processing of the reading motor.

Reference numeral 25 denotes an LF motor for carrying a recording sheet in the subscanning direction, reference numeral 23 denotes a motor driver for driving the motor 25, reference numeral 26 denotes a CR motor for driving a print head-mounted carriage, and reference numeral 24 denotes a motor driver for driving the CR motor 26.

A motor-drive-control circuit of the present invention will be then described. FIG. 2 is an example of a motor driver drive control circuit for a reading motor in a system gate array. The reading motor is a motor that feeds an original in the subscanning direction for reading the original in a facsimile device. Reference numeral 201 denotes a first register that specifies an exciting phase, also reference numeral 202 denotes a second register that holds the values of the first register 201, reference numeral 203 denotes a third register that designates the time when an SW (switching) control is started, reference numeral 204 denotes a shift register which measures the time from the change of the exciting phase, reference numeral 205 denotes a fourth register that specifies the on-off duties of denotes a switch control, 206 a comparator that compares a value written in the first register with the previous value (the value in the second register 202), and generates an RST* signal when the values are different from each other, reference numeral 207 denotes a comparator that compares a value of the third register 203 with a value of the shift register 204, and generates a SWEN signal that allows a switch control when a designated time or further has passed, reference numeral 208 denotes a pulse generating circuit that generates a pulse signal that controls on-off duties at a 50 $\mu$S cycle on the basis of values of the fourth register 205, reference numeral 210 denotes a NAND circuit that generates an SW signal from the SWEN and pulse signals, and reference numeral 209 denotes a port control portion that switches driving of exciting phases on or off by an exclusive control that prohibits the simultaneous driving of the A phase and A* (NOT A) phase, and of the B phase and B* (NOT B) phase, and by the SW signal from the NAND circuit 210.

The reading motor 20 is a four phase unipolar stepping motor, which is driven with the motor driver 22 composed of a transistor array in response to the control signal from the system gate array 18.

The four driving signals correspond to the A, B, A* and B* phases of the four driving coils of the reading motor, respectively. The directions of the forces generated in the rotation axis of the motor by driving of the four driving coils are opposite between the A and A* phases and between the B and B* phases respectively, as shown in FIG. 3. The forces of the A and A* phases and the forces of the B and B* phases act in directions perpendicular to each other. The rotation of the motor is performed by changing the steps of the combinations of the driving of the four coils.

TABLE 1

| step | 1 | 2 | 3 | 4 | 5 | 6 | 7 | 8 |
|---|---|---|---|---|---|---|---|---|
| exciting phases | A | | | A* | A* | A* | A | A |
| | | B | B | B | | | | |
| | | | | | B* | B* | B* | |

In the actual motor driving, the A and A* phases or B and B* phases are not simultaneously driven, that is, the both phases of the combined two pairs are prohibited from being simultaneously driven by the exclusive control of the port control portion 209. Specifically, the driving of the A phase and B phase precedes, and the A* phase when the A phase is driven and the B* phase when the B phase is driven, become invalid.

More specifically, the port control portion 209 includes NOT circuits 209a and 209b and AND circuits 209c to 209h. For example, since the output of the NOT circuit 209a controls the A* phase through two AND circuits 209c and 209f, when the input of the NOT circuit 209a is H (high), the output of the NOT circuit 209a becomes L (low). Thus, only the L output is input into the A* phase and the simultaneous driving is prohibited.

FIG. 4 is a time chart showing operations of a certain period for a motor driving circuit. Specifically, FIG. 4 is a time chart for explaining the operation using an example during the transfer from step 8 (the exciting phase A) to step 1 (the exciting phases A and B) of Table 1.

To the first register 201 are directly written motor driving signals from the CPU 1 as 4 bit data bus signals, and the written driving signals (data) are shifted from the first register 201 to the second register 202 at a given cycle. Phase signals in accordance with the data written in this second register 202 are generated in the port control portion 209, and the phase signals generated in the port control portion 209 are added to the driver 22 to excite the coil of the stepping motor 20. Therefore, by sequentially rewriting data written in the second register 202, the phase signals generated in the port control portion 209 are sequentially rewritten, the coil of the stepping motor 20 is switched to the exciting state through the driver 22, whereby the stepping motor 20 is driven stepwise.

Incidentally, to the first register 201 are sequentially added driving signals (data). When the time from the addition of the first driving signal to the addition of the next driving signal is earlier than the time of a given cycle for shifting data from the first register 201 to the second register 202, that is, when the motor is rotated earlier than a constant speed, the data of the first register 201 does not agree with the data of the second register 202. Accordingly, no RST signal is output from the comparator 206.

On the other hand, when the time from the addition of the first driving signal to the addition of the next driving signal is slower than the time of a given period for shifting data from the first register 201 to the second register 202, that is, when the motor is rotated slower than a constant speed or when the motor is at rest, the data of the first register 201 agrees with the data of the second register 202. Accordingly, a RST signal is output from the comparator 206. That is, when a value of the first register 201 into which a driving signal is input at timing (a) is rewritten by a write signal, a value of the second register 202 that holds the value of the first register agrees with the value of the first register 201. Accordingly, an RST signal is output from the comparator 206. When the RST signal is output from the comparator 206, the shift register 204 is initialized.

The third register 203 is a register that previously specifies the start of the on-off control when given XSH signals of reading periodic signals are input. This third register 203 has setting of XSH=1. Thus, if an XSH signal is input into the initialized shift register 204, a SWEN signal is output from the SWEN generating portion 207 at the timing (b) when the value of the shift register 204 agrees with the value of the third register 203.

The fourth register 205 is a register that is initialized every time the XSH signal is input, and specifies the on-off cycle.

The pulse generating portion 208 decodes the data from the fourth register 205, and generates a pulse signal having the on-off cycle, specified with the fourth register 205. Thus, a SW signal is output from the NAND circuit 210 in response to the pulse signal from the pulse generating portion 208 at the timing (c) the fourth register 205 is initialized. Since the fourth register 205 is initialized by the XSH signal, the duty of the pulse signal is changed at the timing (d), and the SW signal is also changed from the NAND circuit in accordance with the change of the duty.

Thus, since the SW signal that repeats the on-off is output from the NAND circuit 210, the phase signal generated in the port control portion 209 repeats the on-off.

Incidentally, the pulse signal has one cycle of 50 µS, and the on-off duty of one cycle is changed by the specification of the fourth register 205. When the SW control is performed, the 50 µS cycle is set so that the resonance sound generated from the driving system is outside the audible zone.

When driving is performed by the same driving force in low speed driving as that in high speed driving, the force is excessively large whereby the carrying sound becomes large. Therefore, by controlling the switching duty and the period up to the start of switching, adjustments of the driving force are performed thereby to attain the reduction of the driving sound.

As described above, according to the present invention, a motor driving circuit that can positively prevent the passage of current through all of four phases is obtained.

Further, when driving is performed by the same driving force in low speed driving as that in high speed driving, the force is excessively large whereby the carrying sound becomes large. Therefore, by controlling the switching duty and the period up to the start of switching, adjustments of the driving force are performed, whereby a motor driving circuit, which can reduce the driving sound, can be obtained.

What is claimed is:

1. A stepping motor drive control circuit for driving a stepping motor, comprising:

driving means for driving the stepping motor by exciting phases of the stepping motor in response to phase signals;

phase signal generating means, to which driving signals are sequentially added, for sequentially generating the phase signals having different values in accordance with the added driving signals; wherein the sequentially generated phase signals generated by said phase signal generating means are capable of being repeatedly turning on and off so that said phase signal generating means outputs intermittent phase signals in response to control by control means; and control means for controlling said circuit so as to repeat turning-on and turning-off the phase signal generated from said phase signal generating means when a new driving signal is not added to said phase signal generating means for a given time.

2. A stepping motor drive control circuit according to claim 1, further comprising time measuring means for measuring a given time after the driving signal is added to said phase signal generating means, and operating means for operating said control means when the next driving signal is not added to said phase signal generating means within the given time measures with said time measuring means.

3. A stepping motor drive control circuit according to claim 2, wherein the driving signal is a four bit data bus signal, said time measuring means has a first register to which the four bit data bus signal is written and a second register to which data written in the first register is shifted at a given time, and said operating means has comparison means for comparing the value of the first register with the value of the second register within a time corresponding to said given time.

4. A stepping motor drive control circuit according to claim 1, wherein said control means has adjusting means for adjusting the turning-on and turning-off times of the phase signal generated from said phase signal generating means.

5. A stepping motor drive control circuit according to claim 1, wherein the stepping motor is a four phase unipolar motor.

6. A stepping motor drive control circuit according to claim 1, wherein in said driving means, the exciting phase and exciting time of the stepping motor are determined in response to the phase signal.

7. A stepping motor drive control circuit for driving a stepping motor provided with at least two pairs of phases, comprising:

driving means for driving the stepping motor by exciting phases of the stepping motor in response to phase signals;

phase signal generating means, to which driving signals are sequentially added, for sequentially generating the phase signals having different values in accordance with the added driving signals, said phase signal generating means generating a phase signal not so as to simultaneously drive the pair of phases of the stepping motor; wherein the sequentially generated phase signals generated by said phase signal generating means are capable of being repeatedly turning on and off so that said phase signal generating means outputs intermittent phase signals in response to control by control means; and control means for controlling said circuit so as to repeat turning-on and turning-off of a phase signal generated from said phase signal generating means when a new driving signal is not added to said phase signal generating means for a given time.

8. A stepping motor drive control circuit according to claim 7, further comprising time measuring means for measuring a given time after the driving signal is added to said phase signal generating means, and operating means for operating said control means when the next driving signal is not added to said phase signal generating means within the given time measured with said time measuring means.

9. A stepping motor drive control circuit according to claim 8, wherein the driving signal is a four bit data bus signal, said time measuring means has a first register to which the four bit data bus signal is written and a second register to which data written in the first register is shifted at given time, and said operating means has a comparison means for comparing the value of the first register with the value of the second register within a time corresponding to said given time.

10. A stepping motor drive control circuit according to claim 7, wherein in said driving means, the exciting phase and exciting time of the stepping motor are determined in a response to the phase signal.

11. A stepping motor drive control method for driving a stepping motor, comprising:

an adding step of sequentially adding driving signals to a phase signal generator;

a generating step of sequentially generating phase signals having different values in accordance with the driving signals added in said adding step, wherein the sequentially generated phase signals generated by said phase signal generating step are capable of being repeatedly turning on and off so that said phase signal generating step outputs intermittent phase signals in response to control by a controlling step;

a driving step of driving the stepping motor by exciting phases of the stepping motor in response to the phase signals; and a controlling step of controlling said method so as to repeat turning-on and turning-off of a phase signal generated at said generating step, when a new driving signal is not added at said adding step for a given time.

12. A stepping motor drive control method for driving a stepping motor provided with at least two pairs of phases, comprising:

an adding step of sequentially adding driving signals to a phase signal generator;

a generating step of sequentially generating phase signals having different values in accordance with the driving signals added in said adding step, wherein a phase signal is generated not so as to simultaneously drive the pair of phases of the stepping motor, wherein the sequentially generated phase signals generated by said phase signal generating step are capable of being repeatedly turning on and off so that said phase signal generating step outputs intermittent phase signals in response to control by a controlling step;

a driving step of driving the stepping motor by exciting phases of the stepping motor in response to the phase signals; and a controlling step of controlling said method so as to repeat turning-on and turning-off of a phase signal generated at said generating step, when a new driving signal is not added at said adding step for a given time.

* * * * *

UNITED STATES PATENT AND TRADEMARK OFFICE
CERTIFICATE OF CORRECTION

PATENT NO.    : 6,323,617 B1
DATED         : November 27, 2001
INVENTOR(S)   : Kenichi Maruyama et al.

It is certified that error appears in the above-identified patent and that said Letters Patent is hereby corrected as shown below:

Column 1,
Line 11, "facsimile sheet" should read -- facsimile-sheet --.
Line 38, "low" should read -- low --.

Column 2,
Line 26, "switches denotes" should read -- switches --.
Line 28, "11" should read -- 11 denotes --, and "13" should read -- reference numeral 13 --.
Line 29, "21" should read -- Reference numeral 21 --.
Line 34, "reference numeral also 16" should read -- also reference numeral 16 denotes --.
Line 36, "17" should read -- reference numeral 17 --.
Line 40, "19" should read -- reference numeral 19 --.
Line 66, "motor driver" should read -- motor driver --.

Column 3,
Line 1, "drive control" should read -- drive-control --.
Line 9, "which" should read -- that --.
Line 11, "of denotes" should read -- of --.
Line 12, "206" should read -- reference numeral 206 denotes --.
Table 1, column identified as "step 4", "B*" should be deleted.
Table 1, column identified as "step 7" insert -- B* -- in the fourth row.
Line 54, "the both" should read -- both --.

Signed and Sealed this

Eighth Day of October, 2002

Attest:

JAMES E. ROGAN
Attesting Officer
Director of the United States Patent and Trademark Office